R. A. FESSENDEN.
METHOD AND APPARATUS FOR LOCATING SUBMARINES.
APPLICATION FILED SEPT. 26, 1917.

1,348,855.

Patented Aug. 10, 1920.

INVENTOR.
Reginald A. Fessenden.

UNITED STATES PATENT OFFICE.

REGINALD A. FESSENDEN, OF BROOKLINE, MASSACHUSETTS, ASSIGNOR TO SUBMARINE SIGNAL COMPANY, OF PORTLAND, MAINE, A CORPORATION OF MAINE.

METHOD AND APPARATUS FOR LOCATING SUBMARINES.

1,348,855.  Specification of Letters Patent.  Patented Aug. 10, 1920.

Application filed September 26, 1917. Serial No. 193,352.

*To all whom it may concern:*

Be it known that I, REGINALD A. FESSENDEN, of Brookline, in the county of Norfolk and State of Massachusetts, a citizen of the United States, have invented new and useful Improvements in Methods and Apparatus for Locating Submarines, of which the following is the specification.

My invention has for its object the detection of submarines, aeroplanes, and similar bodies.

Figure 1:
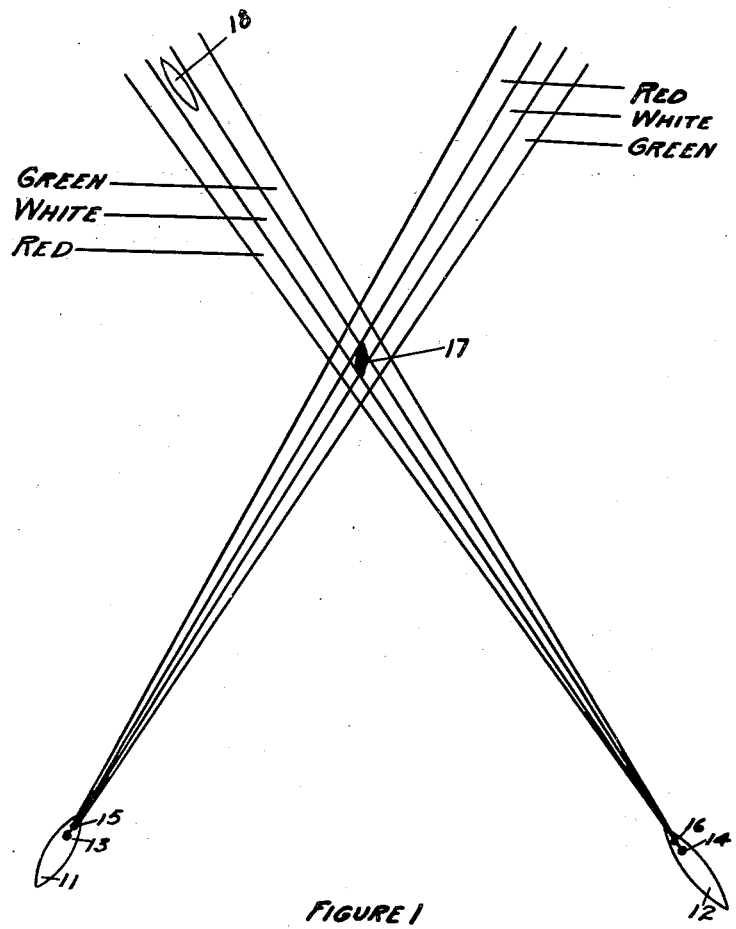
Figure 2:
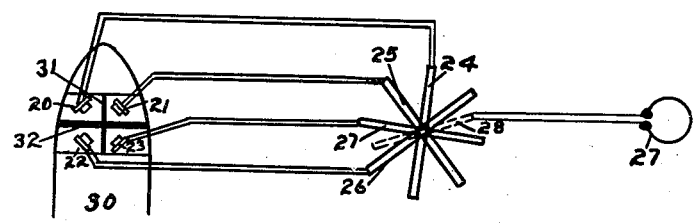

In the accompanying drawings, forming a part of this specification, Figures 1 and 2 show diagrammatically suitable means for carrying out my invention.

In Fig. 1, 17 is a submarine to be detected. 11 and 12 are destroyers fitted with apparatus 15 and 16 for detecting and determining the direction of submarines by means of sound waves or in any other suitable way, for example the sea tubes of Geyer and Broca may be used or oscillators, as shown in Fig. 2. 13 and 14 are projectors, each arranged to throw, as shown, two approximately parallel beams of light, the center beam being white, the beam to the left red and the beam to the right green. Any other suitable combination of colors may be used and instead of colored lights for the two outer beams an intermittent beam having a period of five a second may be used for replacing the red beam and an intermittent beam having a period of one a second may be used in place of the green beam. 18 is a destroyer fitted with depth bombs, either arranged to be thrown from a mortar to a distance or to be dropped from the stern.

In practice, direction of the submarine 17 is located from the two destroyers 11 and 12 by means of the apparatus 15 and 16. The projector 13 is kept pointed, in any suitable way, for example by hand, in the direction indicated by the direction finding apparatus 15 and similarly the projector 14 is kept pointed in the direction indicated by the direction finding apparatus 16. Obviously the submarine will be at the point of intersection of the two white beams.

The destroyer 18 may now proceed to destroy the submarine if it is dark and the point of intersection of the projector beams is visible, by locating the range of the submarine 17 by tracer shells and throwing depth bombs from a mortar so as to enter the water and explode near the point 17.

Or if the day is bright and the point of intersection cannot be seen, the destroyer 18 may place itself in the path of the projector 14 and observe the light from the projector with a telescope or by the unaided eye and run toward the destroyer 12, keeping in the path of the central or white beam. If the destroyer 18 should run too much to the left it will see the green beam and if it runs too much to the right it will see the red beam and in this way it can tell which way to go in order to maintain its course along the white beam.

Another observer on the destroyer 18 will keep his glass on the submarine 17 and on seeing the red beam from the destroyer 11 will know that the destroyer 18 is approaching the point of intersection of the two beams and will give warning so that when a moment later this second observer sees the white beam from the destroyer 11 the depth bomb may be let go, the destroyer 18 being then just above the submarine.

If the apparatus for detecting the submarines is affected by ship noises or by the sound made by surface boats the destroyers 11 and 12 should remain stationary after they have picked up the submarine 17 so that the ship noises will not interfere with the direction finding. Also the ship's auxiliaries may, so far as convenient, be stopped.

For the same reason destroyer 18 should start on the far side of the submarine 17 so that its propellers will be pointed away from the detectors 15 and 16 and on the destroyer 18 coming into the range of the red light of the destroyer 11, the engines on destroyer 18 should be stopped and the destroyer 18 should coast. If the destroyer 18 is proceeding at a speed of 25 knots when she enters the red sector of the destroyer 11, she will coast for the better part of a mile at sufficient speed to get steerage and thus the shutting down of the engines of the destroyer 18 during this period of coasting will prevent the detecting apparatus 15 and 16 from being disturbed by the sounds proceeding from the destroyer 18, and consequently during this period of coasting the position of the submarine 17 may be fixed very accurately by the destroyers 11 and 12 and the destroyer 18 can coast directly over the submarine 17 and upon dropping its depth bomb, start up immediately at high speed and remove itself from the position of explosion.

In Fig. 2 is shown one of the types of detector apparatus referred to.

Here 30 is a destroyer, 20, 21, 22, and 23 are oscillators of the type shown in U. S. Patent 1,167,366, installed in oil tanks in the bow, as shown, and separated by the sound screens 31, 32, as shown. Each of these oscillators is connected to one of the coils 24, 25, 26, 27, arranged radially, as shown. 28 is a movable coil connected to the head telephone, as shown.

Submarine sounds received by the oscillators 20, 21, 22, 23 will vary in intensity according to the location of the submarine. For example, if it is dead astern the sound will be received most strongly by the oscillators 22, 23 and about equally on each so that the movable coil 26 will give its strongest indication when in the position shown and the direction of the submarine may be thus determined.

What I claim is:

1. The method of locating and destroying submarines and similar bodies which comprises determining the position of the submarine by two submarine acoustic direction finders, and maintaining two beams of light in the air each in the direction indicated by the respective acoustic direction finders whereby the place at which the destructive agency is to be applied is indicated.

2. A method of indicating to a second station the presence of submarines or similar bodies, which consists in determining the direction of the submarine or similar body by a submarine direction finder from a first station, and at the first station maintaining as an optical indicator to said second station an optical beam in the direction indicated by the submarine direction finder.

3. The method of locating and destroying submarines and similar bodies which consists in locating by beams of light from two direction-finding stations the direction of such submarine or similar body and transferring submarine destroying means along the direction of one of said beams of light to the intersection of said beams of light by means movable independently of one of said direction-finding stations and applying said submarine-destroying means at the point of intersection of said beams of light.

4. The method of locating and destroying submarines and similar bodies, which consists in locating the direction of the submarine from two points, throwing composite beams of light from each of these two points in the direction indicated at each point; approaching the point of intersection of the two central beams from the far side of the point of intersection relative to the points at which the direction finding apparatus is placed; stopping propeller and other noises emanating from the vessel approaching from the far side, on reaching the outer composite beam, other than that along which the approaching vessel is traveling; and dropping a depth bomb on reaching the point of intersection of the two central beams.

REGINALD A. FESSENDEN.